(12) United States Patent
Tsuritani et al.

(10) Patent No.: US 6,744,989 B2
(45) Date of Patent: Jun. 1, 2004

(54) OPTICAL TRANSMISSION SYSTEM, ITS METHOD, AND OPTICAL AMPLIFICATION TRANSMISSION LINE

(75) Inventors: Takehiro Tsuritani, Kamifukuoka (JP); Yuichi Yamada, Kamifukuoka (JP); Noboru Edagawa, Kamifukuoka (JP); Masatoshi Suzuki, Kamifukuoka (JP)

(73) Assignees: KDDI Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 577 days.

(21) Appl. No.: 09/848,606

(22) Filed: May 2, 2001

(65) Prior Publication Data

US 2002/0003647 A1 Jan. 10, 2002

(30) Foreign Application Priority Data

May 31, 2000 (JP) ........................................ 2000-162623

(51) Int. Cl.[7] ............................................... H04B 10/00
(52) U.S. Cl. ......................... 398/141; 398/92; 398/178; 398/157; 398/200; 359/337.1
(58) Field of Search ............................. 398/90–92, 94, 398/141, 149, 157, 200, 214, 178; 359/337.1

(56) References Cited

U.S. PATENT DOCUMENTS 5,847,862 A   12/1998   Chraplyvy et al. ......... 359/337
5,978,529 A * 11/1999   Taga et al. ..................... 385/24
6,219,176 B1 * 4/2001   Terahara ..................... 359/341.1
6,636,666 B2 * 10/2003  Chan et al. ..................... 385/37

FOREIGN PATENT DOCUMENTS

JP          9-8730         9/1997

* cited by examiner

*Primary Examiner*—Kinfe-Michael Negash
(74) *Attorney, Agent, or Firm*—Christie, Parker & Hale, LLP

(57) ABSTRACT

An object of this invention is to improve transmission characteristics in WDM transmission. An optical transmitter (10) wavelength-multiplexes signal lights of wavelengths $\lambda 1$ through $\lambda n$ and outputs them onto an optical transmission line (12). Optical powers of the signal lights of the respective wavelength $\lambda 1$ through $\lambda n$ are identical or become smaller proportional to the wavelength. One repeater span of the optical transmission line (12) is composed of an optical fibers (20, 22) and an optical amplifier (24), and a gain equalizer (26) is dispersed every several repeater spans. The optical amplifier (24) in the repeater span amplifies each signal light so that optical power of a signal on the shorter wavelength side becomes smaller than that of a signal on the longer wavelength side. The gain equalizer (26) equalizes optical powers of the respective signal lights.

20 Claims, 5 Drawing Sheets

OPTICAL TRANSMISSION SYSTEM, ITS METHOD, AND OPTICAL AMPLIFICATION TRANSMISSION LINE

CROSS-REFERENCE TO RELATED APPLICATION

This application claims priority of Japan patent Application No. 2000-162623, filed on May 31, 2000.

FIELD OF THE INVENTION

This invention relates to an optical transmission system, its method, and an optical amplification transmission line.

BACKGROUND OF THE INVENTION

In conventional optical wavelength multiplexing transmission on an optical amplification transmission line, gain wavelength characteristics of an optical amplifier is set to be flat so as to equalize transmission characteristics of each signal.

An effective core area of an optical fiber generally becomes smaller at a shorter wavelength than it is at a longer wavelength. In the future, when wavelength multiplexing optical transmission is performed in very broad transmission bands, it is impossible to ignore wavelength dependency of an effective core area of an optical fiber. That is, the more a transmission band broadens, the more a difference between effective core areas of the longer and shorter wavelength sides increases. Consequently, the difference of the deteriorations caused by nonlinear effects between the longer and shorter wavelengths cannot be disregarded.

SUMMARY OF THE INVENTION

It is therefore an object of the present invention to provide an optical amplification transmission line and an optical amplification transmission system which solve the above-described problems.

Another object of the present invention is to provide an optical amplification transmission system, its method, and an optical amplification transmission line which solve differences of transmission characteristics based on wavelength dependency of an effective core area.

An optical transmission system according to the invention is composed of an optical transmitter to output a first signal light having a first signal wavelength and a second signal light having second signal wavelength longer than the first signal wavelength, an optical transmission line to transmit the first and second signal lights output from the optical transmitter, and an optical receiver to receive the first and second signal lights output from the optical transmission line, wherein distance average optical power of the first signal light is smaller than that of the second signal light on the optical transmission line. The distance average optical power means the average optical power in a predetermined transmission distance on the optical transmission line.

With the above configuration, it is possible to equalize or almost equalize effective core areas and, thus, optical power density of the first and second signal wavelengths. Consequently, the nonlinear effects of the first and second signal lights become identical, and it is possible to equalize the respective transmission characteristics of the two signal lights.

For example, on an optical transmission line, a difference of optical powers between the first and second signal lights is reduced at one or more predetermined points while the optical power of the second signal light becomes larger than that of the first signal light except for the predetermined points.

When the optical transmission line is composed of at least one optical amplifier to optically amplify the first and second signal lights and at least one optical power difference reducer to reduce the optical power difference between the first and second signal lights, the aforementioned relation of the optical powers between the first and second signal lights can be realized. Preferably, the optical power difference reducer is composed of a means to practically equalize the optical powers of the first and second signal lights, and the optical amplifier has amplification characteristics in which gain of the second signal wavelength is larger than that of the first signal wavelength.

In addition, when the optical transmitter outputs the first and second signal lights onto the optical transmission line in such a condition that the optical power of the first signal light is lower than that of the second signal light, the aforementioned relation of the distance average optical powers between the first and second signal lights can be realized.

To put it more specifically, the optical transmitter outputs a third signal light having a third signal wavelength which is located between the first and second signal wavelengths. Distance average optical power of the third signal light is larger than that of the first signal light and smaller than that of the second signal light on the optical transmission line. The alternative is that the optical transmitter outputs a plurality of signal lights, each having a different signal wavelength located between the first and second signal wavelengths and a distance average optical power of each signal light is larger than that of an adjacent signal light having a shorter signal wavelength on the optical transmission line. When distance average optical powers between channels are controlled according to the above-mentioned method in multi-channel transmission, an effective core area and, consequently, transmission characteristics of each channel can be uniformed.

An optical transmission method according to the invention is composed of steps of outputting a first signal light having a first signal wavelength and a second signal light having a second signal wavelength longer than the first signal wavelength onto an optical transmission line, propagating the first and second signal lights in such a condition that a distance average optical power of the first signal light is smaller than that of the second signal light on the optical transmission line, and receiving the first and second signal lights output from the optical propagation line.

By using the above-steps, it is possible to equalize or almost equalize effective core areas and, thus, optical power density of the first and second signal wavelengths. Consequently, nonlinear effects of the first and second signal lights become identical, and therefore transmission characteristics of the two signal lights can be equalized.

For example, on an optical transmission line, an optical power difference between the first and second signal lights is reduced at one or more predetermined points while the optical power of the second signal light becomes larger than that of the first signal light except for the predetermined points.

To put it more specifically, the first and second signal lights are amplified at practically equal gain on the optical transmission line, and an optical power difference of the first and second signal lights is reduced at one or more predetermined points on the optical transmission line within a range that the optical power of the second signal light is larger than or equal to that of the first signal light. The alternative is that the first and second signal lights are amplified at the gain of the first signal light which is smaller than that of the second signal light on the optical transmission line, and the optical power difference of the first and second signal lights are reduced at one or more predetermined points on the optical transmission line within a range that the optical power of the second signal light is larger than or equal to that of the first signal light. By this, the optical power density of the first and second signal wavelengths can be easily equalized or almost equalized on the transmission line. Consequently, nonlinear effects of the first and second signal lights become identical, and transmission characteristics of the two signal lights can be equalized.

It is also applicable to output the first and second signal lights in a condition that the optical power of the first signal light is lower than that of the second signal light.

Furthermore, a third signal light having a third signal wavelength, which is located between the first and second signal wavelengths, is output onto the optical transmission line. The first, second and third signal lights propagate on the optical transmission line in such a condition that the distance average optical power of the third signal light is larger than that of the first signal light and smaller than that of the second signal light on the optical transmission line. The alternative is that the optical transmitter outputs a plurality of signal lights, each having a different signal wavelength located between the first and second signal wavelengths and each signal light propagates on the optical transmission line in such a condition that the distance average optical power of each signal light is larger than that of an adjacent signal light having a shorter signal wavelength. By controlling the relation between the wavelength and the distance average optical power on the optical transmission line according to the above-mentioned way, in multi-channel transmission, an effective core area and, consequently, transmission characteristics of each channel can be uniformed.

An optical transmission line according to the invention is to transmit a first signal light having a first signal wavelength and a second signal light having a second signal wavelength longer than that of the first signal wavelength and composed of one or more optical amplifiers to optically amplify the first and second signal lights at gains of the first and second wavelengths respectively in which optical power of the first signal light is smaller than that of the second signal light, and at least one optical power difference reducer disposed at predetermined intervals to reduce an optical power difference between the first and second signal lights within a range that distance average optical power of the second signal light in the predetermined interval is larger than that of the first signal light.

With this configuration, it is possible to easily equalize effective core areas and, thus, optical power density of the first and second signal wavelengths on the optical transmission line. As a result, nonlinear effects of the first and second signal lights become almost identical and transmission characteristics of the two signal lights are also equalized.

Preferably, the optical power difference reducer is composed of means to practically equalize the optical powers of the first and second signal lights, and the optical amplifier possesses amplification characteristics in which the gain of the second signal wavelength is larger than that of the first wavelength.

BRIEF DESCRIPTION OF THE DRAWING

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
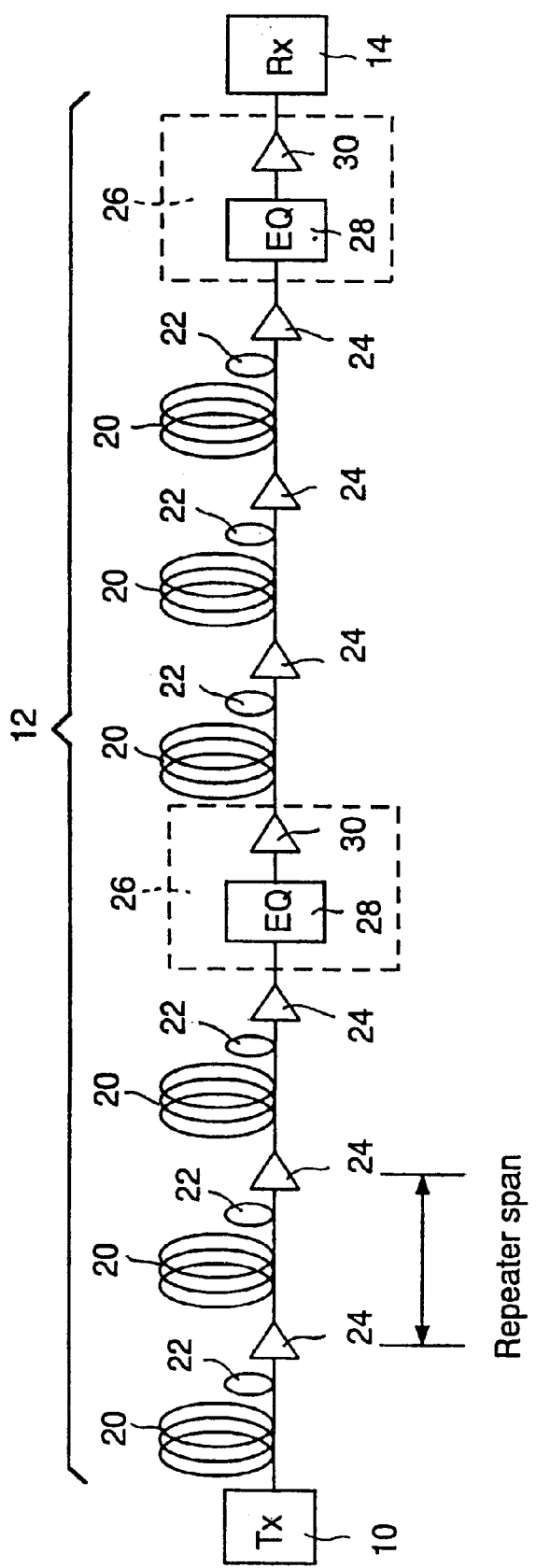
FIG. 1 shows a schematic block diagram of a first embodiment according to the invention.

FIG. 1 shows a schematic block diagram of a first embodiment according to the invention. Reference numeral 10 denotes an optical transmitting terminal to wavelength-multiplex signal lights of wavelengths $\lambda 1$ through $\lambda n$ and to output onto an optical transmission line 12, and reference numeral 14 denotes an optical receiving terminal to receive the signal lights propagated on the optical transmission line 12. The optical transmission line 12 is composed of a plurality of repeater spans, each repeater span is composed of an optical fiber 20 having a large effective core area, an optical fiber having a small effective core area, and an optical amplifier 24. A nonlinear effect can be reduced by disposing the optical fiber 20 having the large effective core area on the input side of the signal lights.

In every repeater span of the predetermined number, a gain equalizer 26 to equalize or almost equalize each power level of the signal lights of the wavelengths $\lambda 1$ through $\lambda n$. The gain equalizer 26 is composed of an optical equalization filter 28 which transmittance differs depending on the wavelengths $\lambda 1$ through $\lambda n$ and an optical amplifier 30 to optically amplify each of the signal lights of the wavelengths $\lambda 1$ through $\lambda n$. Transmission wavelength characteristics of the optical equalization filter 28 are set to have wavelength characteristics of desirable gain equalization as the gain equalizer 26 considering gain wavelength characteristics of the optical amplifier 30. The gain equalizer 26 disposed immediately in front of the optical receiving terminal 14 is sometimes installed in the optical receiving station 14.

The optical amplifier 24 is composed of an erbium-doped optical fiber amplifier and/or a Raman amplifier.

Figure 2:
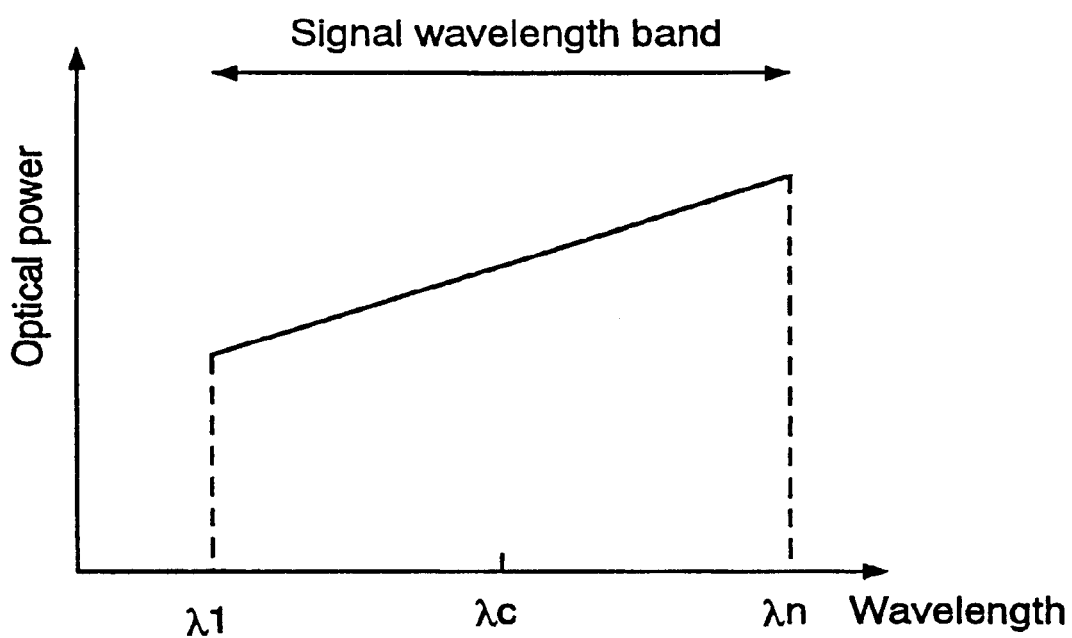
FIG. 2 is a schematic diagram showing a signal power distribution on an optical transmission line 12.

In this embodiment, as shown in FIG. 2, a power level of a signal light having a shorter wavelength is basically set being lower than that of a signal light having a longer wavelength. In FIG. 2, the horizontal axis and the vertical axis express wavelength and optical power level respectively. $\lambda 1$ and $\lambda n$ express the shortest wavelength and the longest wavelength in the signal wavelength band respectively. $\lambda c$ shows a center wavelength of the signal wavelength band. By using this configuration, it is possible to reduce a difference of effective core areas of the optical fibers 20 and 22 in the signal wavelength band, and ideally it is possible to reduce the difference even to zero. Accordingly, a nonlinear effect of each signal light in the signal wavelength band becomes the same and thus equal transmission characteristics can be realized for all channels For instance, optical wavelength division multiplexing optical transmission system of 10 Gb/s×100 wavelengths, it is possible to obtain the same transmission characteristics through the whole area of 100 channels.

As stated above, there are three methods to obtain equal transmission characteristics, more specifically to obtain an equal effective core area, at each channel in a signal wavelength band.

In the first method, while the optical transmitting terminal 10 outputs the signal lights having wavelengths $\lambda 1$ through $\lambda n$, amplification characteristics of the optical amplifier 24 and/or gain equalization characteristics of the gain equalizer 26-1 on the optical transmission line 12 are inclined to the wavelengths so that the power level of the shortest wavelength $\lambda 1$ becomes smaller than that of the longest wavelength $\lambda n$.

In the second method, the amplification characteristics of the optical amplifier 24 and gain equalization characteristics of the gain equalizer 26-1 on the optical transmission line 12 are set to be flat relative to the wavelengths and the power level of the shortest wavelength $\lambda 1$ is set being smaller than that of the longest wavelength $\lambda n$ in the signal lights having wavelengths $\lambda 1$ through $\lambda n$ output from the optical transmitting terminal 10 onto the optical transmission line 12.

In the third method, while the power level of the shortest wavelength $\lambda 1$ is set being smaller than that of the longest wavelength $\lambda n$ in the signal lights having wavelengths $\lambda 1$ through $\lambda n$ output from the optical transmitting terminal 10 onto the optical transmission line 12, amplification characteristics of the optical amplifier 24 and/or gain equalization characteristics of the gain equalizer 26-1 on the optical transmission line 12 are inclined to the wavelengths so that the power level of the shortest wavelength $\lambda 1$ becomes smaller than that of the longest wavelength $\lambda n$. The third method is, so to speak, a combination of the first and second method.

Figure 3:
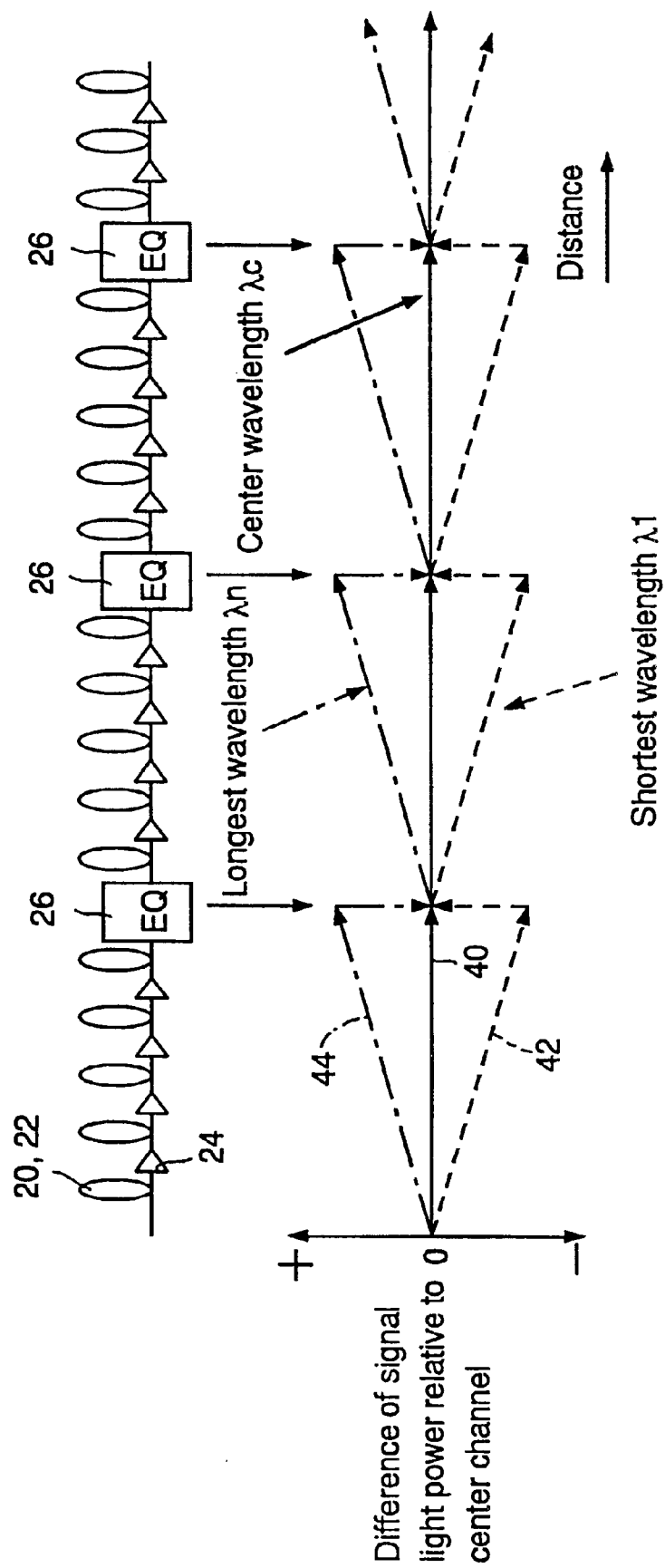
FIG. 3 is a schematic diagram showing optical power variations of the shortest wavelength $\lambda 1$ and the longest wavelength $\lambda n$ on the optical transmission line 12 as relative values to signal light power of a center channel (signal wavelength $\lambda c$)

FIG. 3 is a schematic diagram of an example showing optical power variations of the signal lights having the shortest wavelength $\lambda 1$ and the longest wavelength $\lambda n$ on the optical transmission line 12 as relative values to signal light power at the center channel (signal wavelength $\lambda c$). The vertical axis expresses relative optical power to the optical power of the center channel, and the horizontal axis expresses transmission distance. A solid line 40 shows variations of signal optical power relative to the center channel (signal wavelength $\lambda c$), a broken line 42 shows optical power variations of the shortest signal wavelength $\lambda 1$, and a dotted line 44 shows optical power variations of the longest signal wavelength $\lambda n$. Although it might be unnecessary to say, the solid line 40 shows the constant value zero.

In the embodiment shown in FIG. 3, the gain equalizer 26 equalizes the signal light power of all channels. On the optical amplification transmission line between the gain equalizers 26, 26 optical power of a signal wavelength shorter than the center channel (signal wavelength $\lambda c$) is constantly smaller than that of the center channel (signal wavelength $\lambda c$) being proportional to the wavelength difference between the signal wavelength and the center wavelength $\lambda c$ and, inversely, optical power of a signal wavelength longer than the center channel (signal wavelength $\lambda c$) is larger than that of the center channel (signal wavelength $\lambda c$) being proportional to the wavelength difference between the signal wavelength and the center wavelength $\lambda c$.

Raman gain is applicable as the method to maintain such a state that the signal light power on the longer wavelength side becomes larger than that on the shorter wavelength side. Raman gain is a phenomenon that the optical power of the shorter wavelength shifts to the longer wavelength side. By using this, the optical power of the longer wavelength is maintained to be larger than that of the shorter wavelength. For example, see U.S. Pat. No. 5,847,862 (Japanese Laid-Open Patent Publication No. 9-8730).

Figure 4:
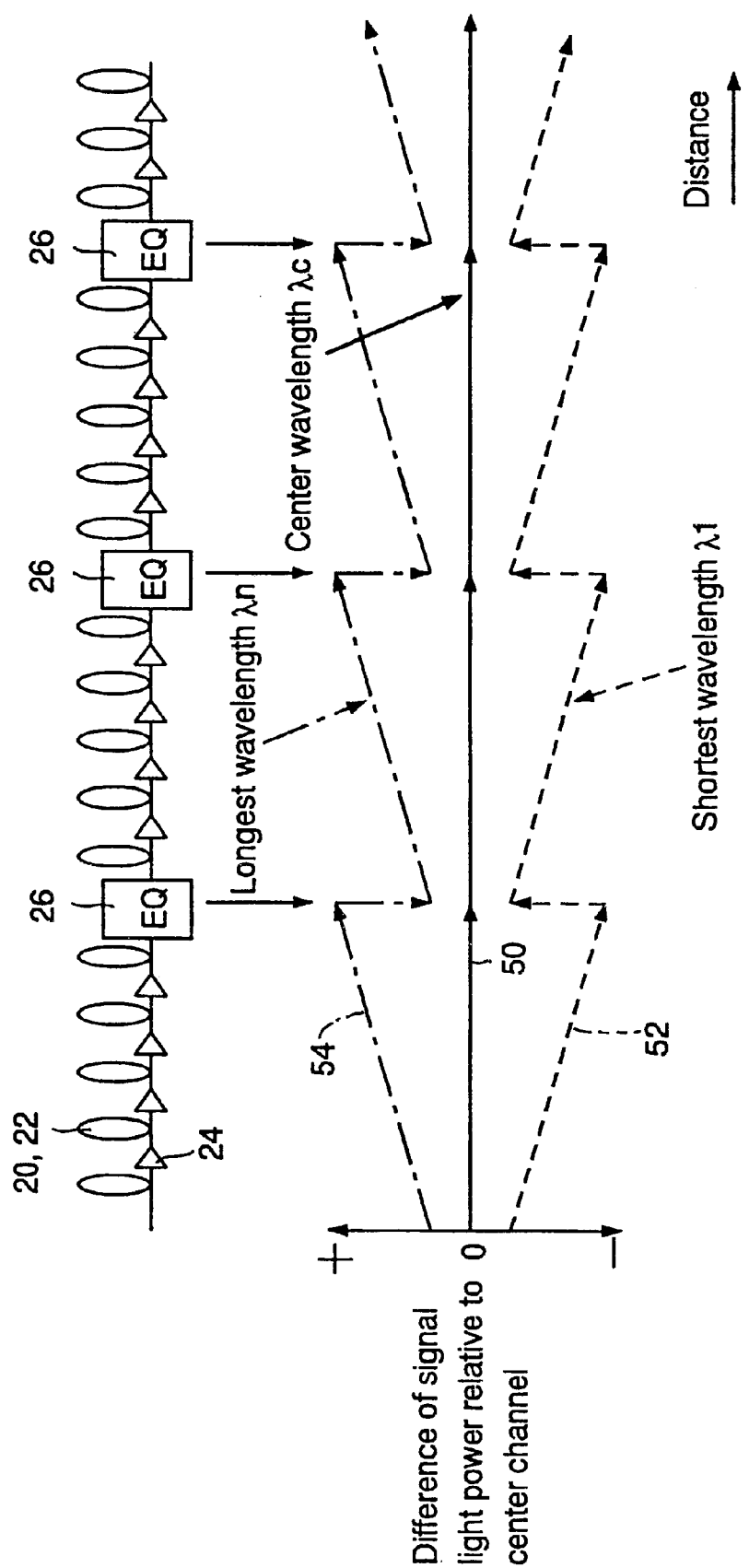
FIG. 4 shows a schematic diagram of another example of optical power variations of the signal lights of the shortest wavelength $\lambda 1$ and the longest wavelength $\lambda n$ on the optical transmission line 12.

FIG. 4 is a schematic diagram showing optical power variations of signal lights of the shortest wavelength $\lambda 1$ and the longest wavelength $\lambda n$ on the optical transmission line 12 when Raman gain is utilized. Similarly, in FIG. 4, the vertical axis expresses relative optical power to the optical power of the center channel, and the horizontal axis expresses transmission distance. A solid line 50 shows a variation of the signal light power relative to the center channel (signal wavelength $\lambda c$), a broken line 52 shows a variation of the optical power of the shortest wavelength $\lambda 1$, and a dotted line 54 shows a variation of the optical power of the longest signal wavelength $\lambda n$. Here again the solid line 50 shows the constant value zero. Even when the gain equalizer 26 has such characteristics to equalize gains of all channels, optical power differences among the channels remain due to the added Raman gain.

Figure 5:
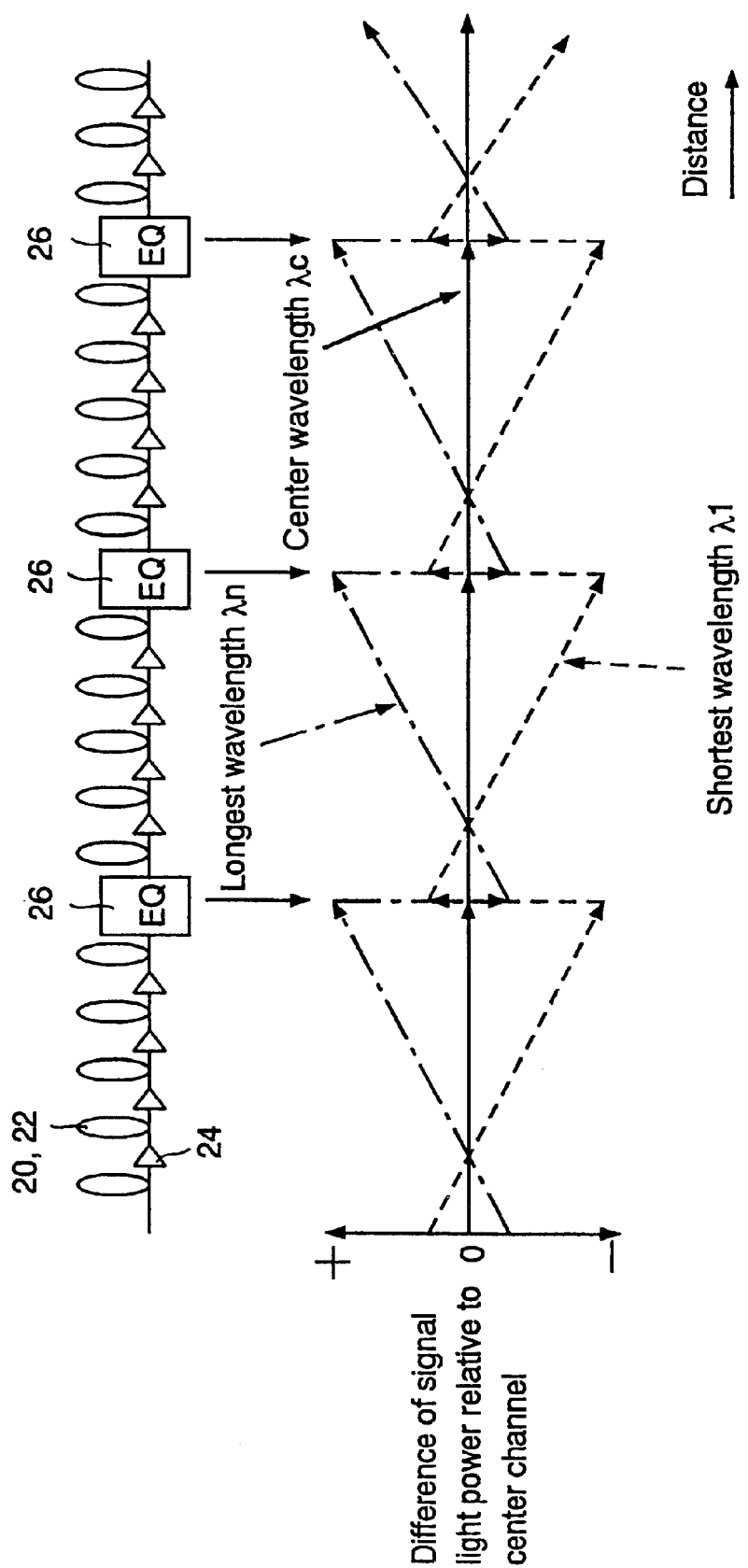
FIG. 5 shows a schematic diagram of still another example of optical power variations of the signal lights of the shortest wavelength $\lambda 1$ and the longest wavelength $\lambda n$ on the optical transmission line 12.

Even though the signal light power of the longest wavelength $\lambda n$ impermanently becomes smaller than that of the shortest wavelength $\lambda 1$ immediately after passing through the gain equalizer 26, it is possible to obtain the same action effect by adjusting the optical amplifier 24 on the way and gain wavelength characteristics of Raman gain so as to make the average optical power between the gain equalizers 26, 26 show characteristics identical to those shown in FIG. 2. An optical power variation of this case is shown in FIG. 5.

Explained below are methods to determine the optimum difference of distance average optical powers of the two wavelengths $\lambda 1$ and $\lambda n$ between the gain equalizers 26, 26 to equalize nonlinear effects of the two wavelengths $\lambda 1$ and $\lambda n$.

In the first method, a nonlinear phase shift amount (a phase shift amount due to self phase modulation) which occupies a main amount of a nonlinear effect is calculated and wavelength dependency of the gain of the gain equalizer 26 and wavelength dependency of gain between the gain equalizers 26, 26 are adjusted so as to have the optical power difference of an amount according to the calculated difference of the calculated nonlinear phase shift amount. A nonlinear phase shift amount of a transmission distance is obtained from a following expression:

$$\int n_2 \omega P e^{-\alpha z}/(cAeff(\lambda))dz$$

where $n_2$ shows a nonlinear constant, $\omega$ shows a angle frequency, c shows an optical rate, $Aeff(\lambda)$ shows an effective core area of wavelength $\lambda$, P shows input optical power to an optical fiber, $\alpha$ shows a loss coefficient of an optical fiber, and z shows a propagation direction of a signal light.

For instance, on an optical fiber transmission line in which the first half is made of a single mode optical fiber (SMF) and the latter half is made of a dispersion compensating fiber (DCF), phase shift amount difference of signal lights of 60 nm intervals was approximately 0.35 dB. When the gain equalizers 26 are disposed at every 10 repeaters, a signal light having the shortest wavelength $\lambda 1$ receives a nonlinear effect of approximately 3.5 dB (2.2 times) relative to that of a signal light of the longest wavelength $\lambda n$. Accordingly, in this embodiment, an optical power integral value of the signal light having the longest wavelength $\lambda n$ between the gain equalizers 26, 26 is set to 3.5 dB larger than that of the shortest wavelength $\lambda 1$. In practice, since there are some nonlinear effects which are not included in the above expression, it is preferable to set the difference more than 3.5 dB.

When the first half of one repeater span is composed of an optical fiber having a larger effective core area and the latter half is composed of an optical fiber having a smaller effective core area, the optical fiber having the smaller effective core area has larger wavelength dependency of the effective core area. Accordingly, in the second method, the gain equalization characteristics of the gain equalizer 26 is set so as to compensate the wavelength dependency of the effective core area of the optical fiber having the smaller effective core area. In one repeater span, for example, when there is a difference corresponding to approximately 0.7 dB in a transmission band 60 nm, the gain equalization characteristics of the gain equalizer 26 is set to compensate the difference. When the gain equalizers 26 are disposed every 10 repeaters, for example, gain differences of the gain equalizers 26 in the transmission band are set to 7 dB. However, this is the case that the difference of the nonlinear effects becomes the maximum. Accordingly, in practice, it is preferable to set the gain difference smaller than 7 dB.

As stated above, by controlling signal light power so that distance average power within a gain equalizing interval of a signal on the shorter wavelength side which has smaller durability for nonlinearity becomes constantly smaller than that of a signal on the longer wavelength side, transmission deterioration caused by a nonlinear effect of the optical signal on the shorter wavelength side can be reduced. As a result, equal and satisfactory transmission characteristics can be realized in all channels of wavelength multiplexed signals.

As readily understandable from the aforementioned explanation, according to the invention, in wavelength division multiplexing optical transmission, it is possible to obtain equal transmission characteristics in all wavelength channels. Accordingly, it is possible to realize a long haul optical transmission system of an ultra broad band as many as 10 Gb ps×100 channels.

While the invention has been described with reference to the specific embodiment, it will be apparent to those skilled in the art that various changes and modifications can be made to the specific embodiment without departing from the spirit and scope of the invention as defined in the claims.

What is claimed is:

1. An optical transmission system comprising:
    an optical transmitter to output a first signal light having a first signal wavelength and a second signal light having a second signal wavelength longer than the first signal wavelength;
    an optical transmission line to transmit the first and second signal lights output from the optical transmitter; and
    an optical receiver to receive the first and second signal lights output from the optical transmission line;
    wherein an average optical power of the first signal light is smaller than that of the second signal light over a distance on the optical transmission line.

2. The optical transmission system of claim 1 wherein a difference of the optical powers between the first and second signal lights is reduced at one or more predetermined points on the optical transmission line, and the optical power of the second signal light is larger than that of the first signal light except for the predetermined points.

3. The optical transmission system of claim 1 wherein the optical transmission line comprises one or more optical amplifiers to optically amplify the first and second signal lights and one or more optical power difference reducers to reduce an optical power difference between the first and second signal lights.

4. The optical transmission system of claim 3 wherein the optical power difference reducer comprises means to practically equalize optical powers of the first and second signal lights, and the optical amplifier comprises amplification characteristics in which the gain of the second signal light is larger than that of the first signal light.

5. The optical transmission system of any one of claims 1 through 4 wherein the optical transmitter outputs the first and second signal lights onto the optical transmission line in such a condition that the optical power of the first signal light is smaller than that of the second signal light.

6. The optical transmission system of claim 1 wherein the optical transmitter outputs a third signal light having a third signal wavelength which is located between the first and second signal wavelengths, and an average optical power of the third signal light is larger than that of the first signal light and smaller than that of the second signal light over the distance on the optical transmission line.

7. The optical transmission system of claim 1 wherein the optical transmitter outputs a plurality of signal lights, each having a different signal wavelength ranged between the first and second signal wavelengths, and an average optical power of each of the signal lights is larger than that of an adjacent signal light having a shorter wavelength over the distance on the transmission line.

8. An optical transmission method comprising steps of:
    outputting onto an optical transmission line a first signal light having a first signal wavelength and a second signal light having a second signal wavelength longer than the first signal wavelength;
    propagating the first and second signal lights such that an average optical power of the first signal light is smaller than that of the second signal light over a distance on the optical transmission line; and
    receiving the first and second signal lights output from the optical transmission line.

9. The optical transmission method of claim 8 wherein a difference of optical powers between the first and second signal lights is reduced at one or more predetermined points on the optical transmission line, and the optical power of the second signal light is larger than that of the first signal light except for the predetermined points.

10. The optical transmission method of claim 8 further comprising steps of amplifying the first and second signal lights at practically equal gains on the optical transmission line and reducing an optical power difference between the first and second signal lights within a range and such that an optical power of the second signal light is larger than or equal to that of the first signal light at one or more predetermined points on the optical transmission line.

11. The optical transmission method of claim 8 further comprising steps of amplifying the first and second signal lights such that a gain of the first signal light is smaller than that of the second signal light on the optical transmission line and reducing an optical power difference between the first and second signal lights within a range and such that an optical power of the second signal light is larger than or equal to that of the first signal light at one or more predetermined points on the optical transmission line.

12. The optical transmission method as in any of claims 8 through 11 wherein the optical power of the first signal light is smaller than that of the second signal light.

13. The optical transmission method of claim 8 wherein the outputting step comprises outputting a third signal light having a third signal wavelength located between the first and second signal wavelengths, the propagating step comprises propagating the first, second and third signal lights such that an average optical power of the third signal light is larger than that of the first signal light and smaller than that of the second signal light over the distance on the optical transmission line, and the receiving step comprises receiving the first, second and third signal lights output from the optical transmission line.

14. The optical transmission method of claim 8 wherein the outputting step comprises outputting a plurality of signal lights, each having a different wavelength ranged between the first and second signal wavelengths, the propagating step comprises propagating the respective signal lights such that an average optical power of each signal light over the distance on the optical transmission line is larger than that of an adjacent signal light having a shorter signal wavelength, and the receiving step comprises receiving the respective signal lights output from the optical transmission line.

15. An optical transmission line to propagate a first signal light having a first signal wavelength and a second signal light having a second signal wavelength longer than the first signal wavelength, comprising:

one or more optical amplifiers to optically amplify the first and second signal lights at gains such that an optical power of the first signal light is smaller than that of the second signal light; and one or more optical power difference reducers disposed at predetermined intervals to reduce an optical power difference between the first and second signal lights within a range such that an average optical power of the second signal light in the predetermined interval is larger than or equal to that of the first signal light over a distance on the optical transmission line.

16. The optical transmission line of claim 15 wherein the optical power difference reducer comprises means to practically equalize optical powers of the first and second signal lights, and the optical amplifier comprises amplification characteristics in which the gain of the second signal light is larger than that of the first signal light.

17. The optical transmission line of claim 15 wherein the transmission line propagates a third signal light having a third signal wavelength located between the first and second signal wavelengths, further comprising;

the optical amplifiers which optically amplify the third signal light at a gain such that the optical power of the third signal light is larger than that of the first signal light but smaller than that of the second signal light; and the optical power difference reducers which reduce the optical power difference between the first, second and third signal lights within a range such that the distance average optical power of the third signal light in the predetermined interval is larger than or equal to that of the first signal light and smaller than or equal to that of the second signal light.

18. The optical transmission line of claim 15 wherein the transmission line propagates a plurality of signal lights each having a different signal wavelength located between the first signal second signal wavelengths, further comprising;

the optical amplifiers which optically amplify the plurality of signal lights at gains such that the optical power of each of the signal lights is larger than that of the first signal light but smaller than that of the second signal light; and the optical power difference reducers which reduce the optical power difference between the first, second and plurality of signal lights within a range such that the distance average optical power of each of the plurality of signal lights in the predetermined interval is larger than or equal to that of the first signal light and smaller than or equal to that of the second signal light.

19. The optical transmission line of claim 17 wherein the optical power difference reducer comprises a means to practically equalize optical powers of the first, second and third signal lights, and the optical amplifier comprises amplification characteristics in which the gain of the third signal light is larger than that of the first signal light but smaller than that of the second signal light.

20. The optical transmission line of claim 18 wherein the optical power difference reducer comprises a means to practically equalize optical powers of the first, second and plurality of signal lights, and the optical amplifier comprises amplification characteristics in which each of the gains of the plurality of signal lights is larger than that of the first signal light but smaller than that of the second signal light.

* * * * *